United States Patent
Park et al.

(10) Patent No.: US 9,036,556 B2
(45) Date of Patent: May 19, 2015

(54) APPARATUS AND METHOD OF REPORTING POWER HEADROOM IN WIRELESS COMMUNICATION SYSTEM

(75) Inventors: Sung Jun Park, Gyeonggi-do (KR); Sung Duck Chun, Gyeonggi-do (KR); Sung Hoon Jung, Gyeonggi-do (KR); Seung June Yi, Gyeonggi-do (KR); Young Dae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 167 days.

(21) Appl. No.: 13/980,351

(22) PCT Filed: Mar. 21, 2012

(86) PCT No.: PCT/KR2012/002018
§ 371 (c)(1),
(2), (4) Date: Jul. 18, 2013

(87) PCT Pub. No.: WO2012/128549
PCT Pub. Date: Sep. 27, 2012

(65) Prior Publication Data
US 2013/0301536 A1    Nov. 14, 2013

Related U.S. Application Data

(60) Provisional application No. 61/466,437, filed on Mar. 22, 2011.

(51) Int. Cl.
*H04W 24/10*    (2009.01)
*H04W 52/36*    (2009.01)
*H04W 52/58*    (2009.01)

(52) U.S. Cl.
CPC ............ *H04W 24/10* (2013.01); *H04W 52/365* (2013.01); *H04W 52/58* (2013.01)

(58) Field of Classification Search
CPC .... H04W 24/10; H04W 52/365; H04W 52/58
See application file for complete search history.

(56) References Cited

U.S. PATENT DOCUMENTS

2009/0191910 A1 *   7/2009   Athalye et al. ................ 455/522
2010/0238830 A1     9/2010   Kim et al.
(Continued)

FOREIGN PATENT DOCUMENTS

| EP | 2136586 A1 | 12/2009 |
| KR | 10-2009-0131653 A | 12/2009 |

(Continued)

OTHER PUBLICATIONS

International Search Report issued in corresponding International Patent Application No. PCT/KR2012/002018 dated Oct. 29, 2012.

(Continued)

*Primary Examiner* — Robert Wilson
(74) *Attorney, Agent, or Firm* — Morgan, Lewis & Bockius LLP (57) ABSTRACT

A method and apparatus of reporting a power headroom in a wireless communication system is provided. A user equipment transmits a first power headroom report to a base station and starts a virtual power backoff timer upon transmitting the first power headroom report. When a second power headroom report is triggered while the virtual power backoff timer is running, the user equipment transmits the second power headroom report.

12 Claims, 9 Drawing Sheets

(56) References Cited

U.S. PATENT DOCUMENTS

| | | | |
|---|---|---|---|
| 2010/0238863 A1 | 9/2010 | Guo et al. | |
| 2012/0207040 A1* | 8/2012 | Comsa et al. | 370/252 |
| 2013/0121203 A1* | 5/2013 | Jung et al. | 370/252 |
| 2013/0301536 A1* | 11/2013 | Park et al. | 370/328 |
| 2014/0056278 A1* | 2/2014 | Marinier et al. | 370/330 |

FOREIGN PATENT DOCUMENTS

| | | |
|---|---|---|
| KR | 10-2010-0104351 A | 9/2010 |
| KR | 10-2010-0106246 A | 10/2010 |
| KR | 10-2010-0126549 A | 12/2010 |
| WO | 2009/120634 A1 | 10/2009 |

OTHER PUBLICATIONS

3rd Generation Partnership Project: Technical Specification Group Radio Access Network; Evolved Universal Terrestrial Radio Access (E-UTRA) Requirements for support of radio resource management (Release 10); 3GPP TS 36.133 v10.1.0 (Dec. 2010), pp. 1-402.

* cited by examiner

| $C_7$ | $C_6$ | $C_5$ | $C_4$ | $C_3$ | $C_2$ | $C_1$ | R |
|---|---|---|---|---|---|---|---|
| P | V | \multicolumn{6}{c|}{$PHL_1$} |
| R | R | \multicolumn{6}{c|}{$TP_1$} |
| P | V | \multicolumn{6}{c|}{$PHL_2$} |
| R | R | \multicolumn{6}{c|}{$TP_2$} |
| P | V | \multicolumn{6}{c|}{$PHL_3$} |
| R | R | \multicolumn{6}{c|}{$TP_3$} |

...

| P | V | $PHL_N$ |
|---|---|---|
| R | R | $TP_N$ |

APPARATUS AND METHOD OF REPORTING POWER HEADROOM IN WIRELESS COMMUNICATION SYSTEM

TECHNICAL FIELD

The present invention relates to wireless communications, and more particularly, to a method and apparatus of reporting a power headroom in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

It is important to properly regulate a transmit power when a user equipment (UE) transmits data to a base station (BS). If the transmit power is too low, the BS may not be able to correctly receive the data. If the transmit power is too high, it may cause interference to another UE. Therefore, the BS regulates the transmit power of the UE in a wireless communication system.

In order for the BS to regulate the transmit power of the UE, it is required to acquire essential information from the UE. A representative example thereof is a power headroom. The power headroom implies a power that can be further used in addition to the transmit power currently used by the UE. The power headroom may imply a difference between a maximum transmit power of the UE and the currently used transmit power.

When the BS receives the power headroom from the UE, the BS determines a transmit power to be used in next UE's uplink transmission on the basis of the power headroom. The determined transmit power is indicated by a resource block size and a modulation and coding scheme (MCS).

When a transmit power used by the BS in uplink scheduling is different from a transmit power that can be actually used by the UE, reliability of uplink transmission may deteriorate.

DISCLOSURE

Technical Problem

The present invention provides a method and apparatus of transmitting a power headroom report in a wireless communication system.

Technical Solution

In an aspect, a method of reporting a power headroom in a wireless communication system is provided. The method includes transmitting a first power headroom report to a base station, the first power headroom report including a power headroom level indicating a power headroom and a first backoff indicator indicating whether the user equipment applies power backoff due to power management, starting a virtual power backoff timer upon transmitting the first power headroom report, and when a second power headroom report is triggered while the virtual power backoff timer is running, transmitting the second power headroom report including a second backoff indicator with a same value of the first backoff indicator.

The power headroom report may further include a transmit power field indicating a configured transmit power used to determine the power headroom.

The first backoff indicator may be set to one if the transmit power field would have had a different value if no power backoff due to power management had been applied.

The virtual power backoff timer may be started if the value of the first backoff indicator is set to one.

In another aspect, a user equipment for reporting a power headroom in a wireless communication system is provided. The user equipment includes a radio frequency unit configured to transmit and receive a radio signal, and a processor operatively coupled with the radio frequency unit and configured to transmit a first power headroom report to a base station, the first power headroom report including a power headroom level indicating a power headroom and a first backoff indicator indicating whether the user equipment applies power backoff due to power management, start a virtual power backoff timer upon transmitting the first power headroom report, and when a second power headroom report is triggered while the virtual power backoff timer is running, transmit the second power headroom report including a second backoff indicator with a same value of the first backoff indicator.

Advantageous Effects

When calculating a transmit power, it is possible to prevent a mismatch between the BS and the UE. The BS can more accurately perform UL scheduling.

MODE FOR INVENTION

Figure 1:
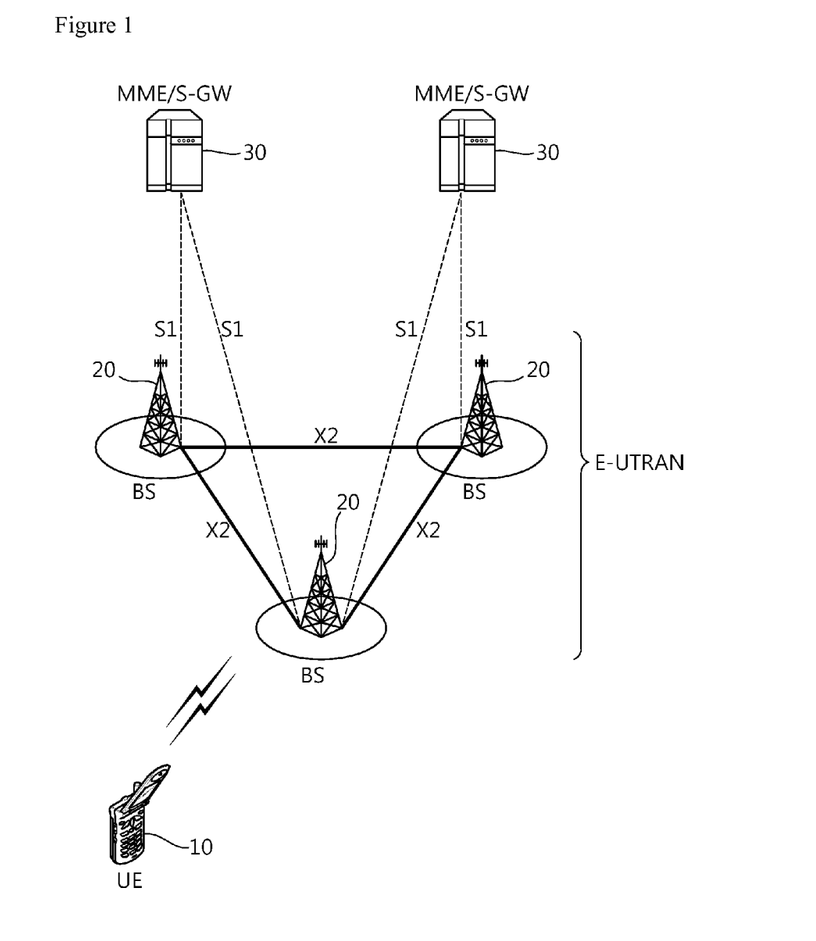
FIG. 1 shows a wireless communication system to which the present invention is applied.

FIG. 1 shows a wireless communication system to which the present invention is applied. A wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
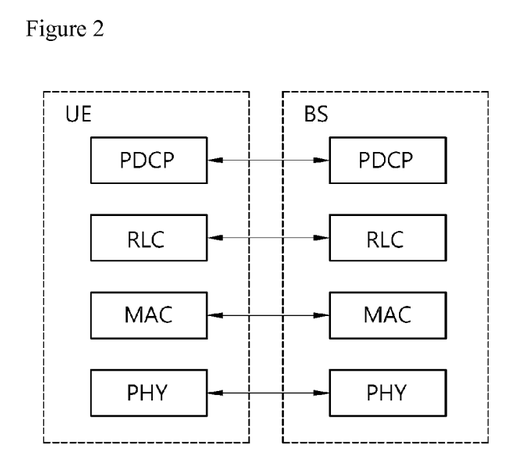
FIG. 2 is a diagram showing a radio protocol architecture for a user plane.
Figure 3:
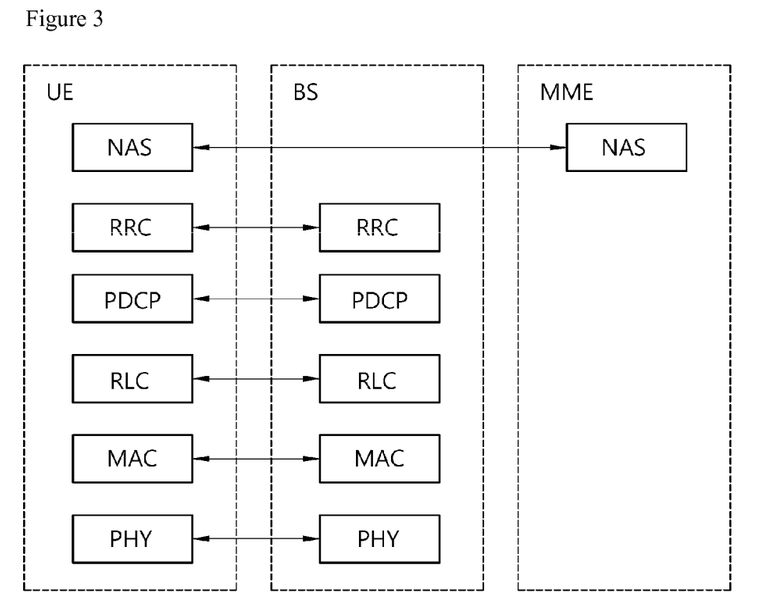
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

As disclosed in 3GPP TS 36.211 V8.7.0, the 3GPP LTE classifies physical channels into a data channel, i.e., a physical downlink shared channel (PDSCH) and a physical uplink shared channel (PUSCH), and a control channel, i.e., a physical downlink control channel (PDCCH), Physical Control Format Indicator Channel (PCFICH), Physical Hybrid-ARQ Indicator Channel (PHICH) and a physical uplink control channel (PUCCH).

Now, a multiple carrier system will be disclosed.

A 3GPP LTE system supports a case where a downlink bandwidth and an uplink bandwidth are set differently under the premise that one component carrier (CC) is used. The CC is defined with a center frequency and a bandwidth. This implies that the 3GPP LTE is supported only when the downlink bandwidth and the uplink bandwidth are identical or different in a situation where one CC is defined for each of a downlink and an uplink. For example, the 3GPP LTE system supports up to 20 MHz and the uplink bandwidth and the downlink bandwidth may be different from each other, but supports only one CC in the uplink and the downlink.

Spectrum aggregation (or bandwidth aggregation, also referred to as carrier aggregation) supports a plurality of CCs. The spectrum aggregation is introduced to support an increasing throughput, to prevent a cost increase caused by using a broadband radio frequency (RF) element, and to ensure compatibility with legacy systems.

Figure 4:
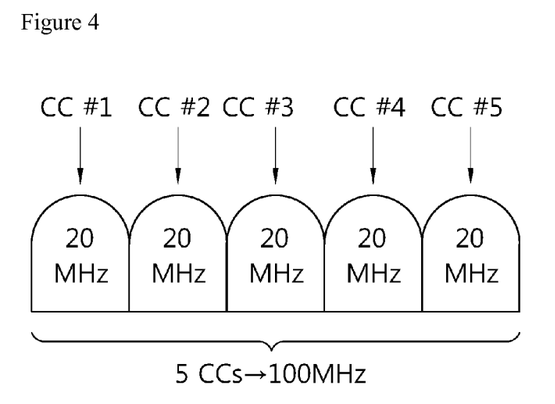
FIG. 4 shows an example of multiple carriers.

FIG. 4 shows an example of multiple carriers. There are five CCs, i.e., CC #1, CC #2, CC #3, CC #4, and CC #5, each of which has a bandwidth of 20 MHz. Therefore, if the five CCs are allocated in a granularity of a CC unit having the bandwidth of 20 MHz, a bandwidth of up to 100 MHz can be supported.

The bandwidth of the CC or the number of the CCs are exemplary purposes only. Each CC may have a different bandwidth. The number of downlink CCs and the number of uplink CCs may be identical to or different from each other.

Figure 5:
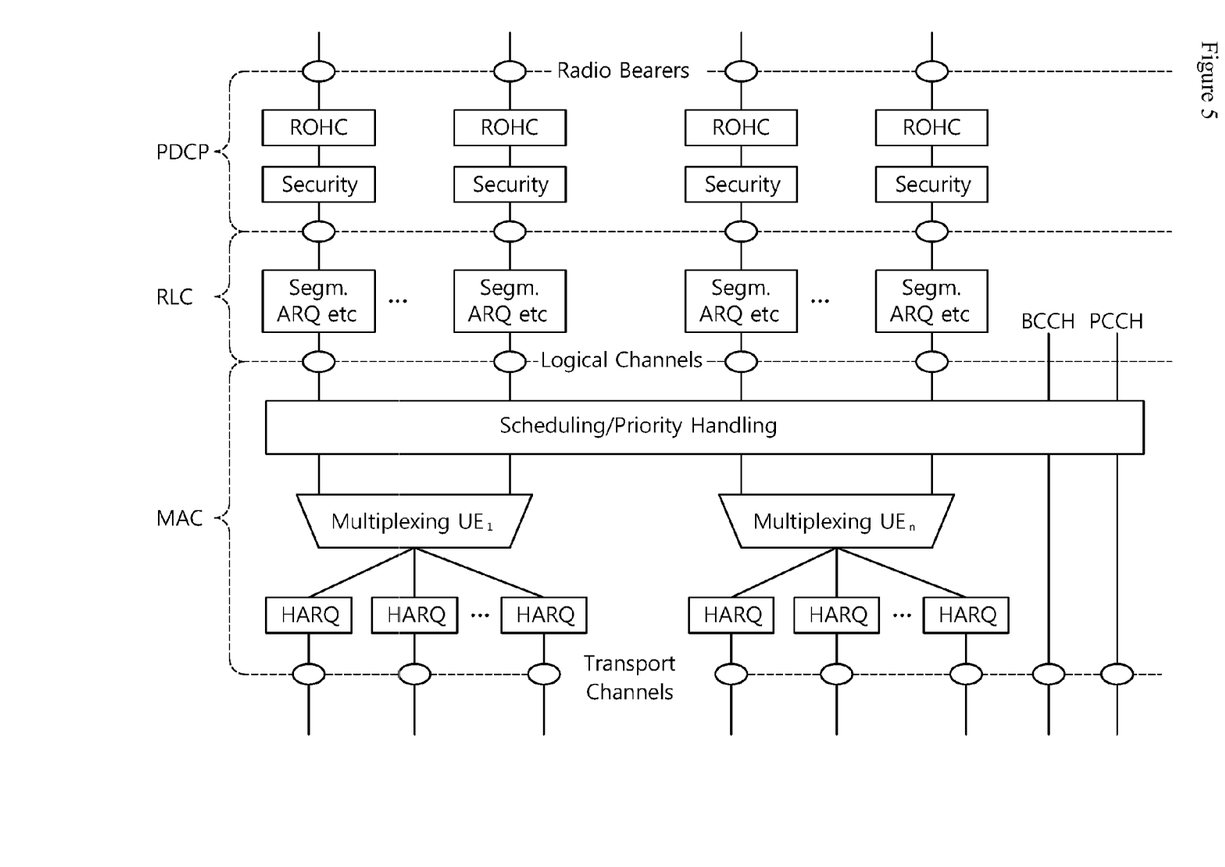
FIG. 5 shows a second-layer structure of a BS for multiple carriers.
Figure 6:
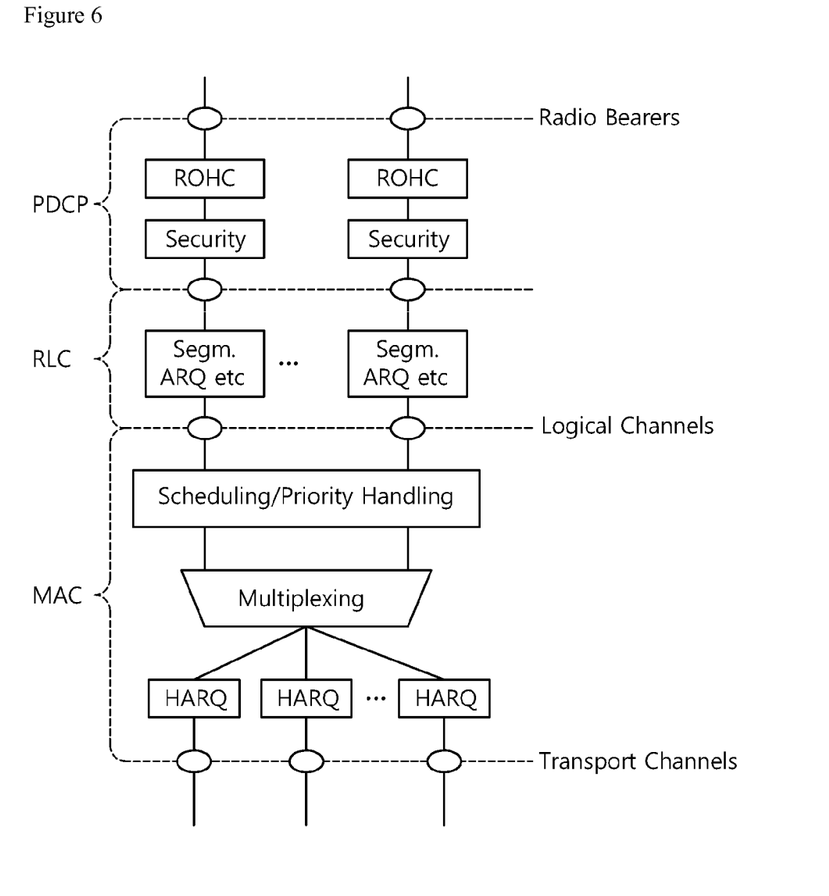
FIG. 6 shows a second-layer structure of a UE for multiple carriers.

FIG. 5 shows a second-layer structure of a BS for multiple carriers. FIG. 6 shows a second-layer structure of a UE for multiple carriers.

A MAC layer can manage one or more CCs. One MAC layer includes one or more HARQ entities. One HARQ entity performs HARQ on one CC. Each HARQ entity independently processes a transport block on a transport channel. Therefore, a plurality of HARQ entities can transmit or receive a plurality of transport blocks through a plurality of CCs.

One CC (or a CC pair of a downlink CC and an uplink CC) may correspond to one cell. When a synchronous signal and system information are provided by using each downlink CC, it can be said that each downlink CC corresponds to one serving cell. When the UE receives a service by using a plurality of downlink CCs, it can be said that the UE receives the service from a plurality of serving cells.

The BS can provide the plurality of serving cells to the UE by using the plurality of downlink CCs. Accordingly, the UE and the BS can communicate with each other by using the plurality of serving cells.

A cell may be classified into a primary cell and a secondary cell. The primary cell which is always activated is a cell used for network entry such as a RRC connection establishment, RRC connection re-establishment, etc. A secondary cell may be activated or inactivated by the primary cell or a specific condition. The primary cell may be configured with a pair of DL CC and UL CC. The secondary cell may be configured with a pair of DL CC and UL CC or a DL CC only. Serving cells include one or more primary cells and zero or more secondary cells.

Next, a power headroom reporting will be disclosed.

To mitigate interference due to UL transmission, a transmit power of a UE needs to be adjusted. If the transmit power of the UE is too low, the BS barely receive UL data. If the transmit power of the UE is too high, the UL transmission may give too much interference to other UE's transmission.

A power headroom reporting procedure is used to provide the serving BS with information about the difference between the nominal UE maximum transmit power and the estimated power for UL-SCH transmission. RRC controls the power headroom reporting by configuring the two timers, a periodic timer and prohibit timer, and by signalling a pathloss threshold which sets the change in measured downlink pathloss to trigger the power headroom reporting.

According to the section 5.1.1 of 3GPP TS 36.213 V8.8.0 (2009-09) "Evolved Universal Terrestrial Radio Access (E-UTRA); Physical layer procedures (Release 8)", a power headroom valid for subframe i is defined by:

$$PH(i)=P_{CMAX}-\{10\log_{10}(M_{PUSCH}(i)+P_{O\_PUSCH}(j)+\alpha(j)PL+\Delta_{TF}(i)+f(i)\}$$ [Math Figure 1]

where, $P_{CMAX}$ is a configured maximum UE transmitted power, $M_{PUSCH}(i)$ is the bandwidth of the PUSCH resource assignment expressed in number of resource blocks valid for subframe i, PL is a downlink pathloss estimate calculated in the UE, and $P_{O\_PUSCH}(j)$, $\alpha(j)$, $\Delta_{TF}(j)$ and f(i) are parameters obtained from higher layer signaling.

For multiple carrier system, $P_{CMAX,c}$ denotes $P_{CMAX}$ for a serving cell c.

A power headroom report (PHR) may be triggered if any of the following events occur:
 a prohibit timer expires or has expired and the path loss has changed more than the pathloss threshold since the transmission of a PHR when UE has UL resources for new transmission;
 a periodic timer expires;
 upon configuration or reconfiguration of the power headroom reporting functionality by upper layers, which is not used to disable the function.

If the UE has UL resources allocated for new transmission for this TTI:
 if it is the first UL resource allocated for a new transmission since the last MAC reset, start the periodic timer;
 if the power headroom reporting procedure determines that at least one PHR has been triggered since the last transmission of a PHR or this is the first time that a PHR is triggered, and;

if the allocated UL resources can accommodate a PHR MAC control element plus its subheader as a result of logical channel prioritization:
 obtain the value of the power headroom from the physical layer;
 instruct the Multiplexing and Assembly procedure to generate and transmit a PHR MAC control element based on the value reported by the physical layer;
 start or restart the periodic timer;
 start or restart the prohibit timer;
 cancel all triggered PHR(s).

The power headroom is transmitted as a MAC control element.

Figure 7:
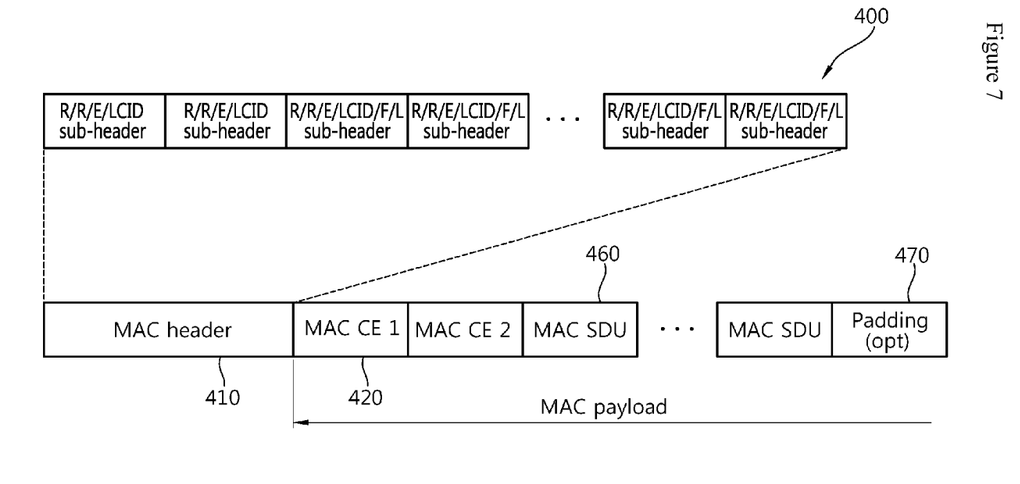
FIG. 7 shows a structure of a MAC PDU in 3GPP LTE.

FIG. 7 shows a structure of a MAC PDU in 3GPP LTE.

A MAC Protocol Data Unit (PDU) 400 includes a MAC header 410, zero or more MAC control elements (CEs) 420, zero or more MAC service data units (SDUs) 460 and optionally padding bits 470. Both the MAC header 410 and the MAC SDUs 460 are of variable sizes. The MAC SDUs 460 is a data block provided from a higher layer (e.g., an RLC layer or an RRC layer) of a MAC layer. The MAC CE 420 is used to deliver control information of the MAC layer such as a BSR.

The MAC PDU header 410 includes one or more subheaders 411. Each subheader corresponds to either a MAC SDU, a MAC CE or padding bits.

The subheader 411 includes six header fields R/R/E/LCID/F/L but for the last subheader in the MAC PDU 400 and for fixed sized MAC CEs. The last subheader in the MAC PDU 410 and subheaders for fixed sized MAC CEs include solely of the four header fields R/R/E/LCID. A subheader corresponding to the padding bits includes four header fields R/R/E/LCID.

Descriptions on each field are as follows.
 R (1 bit): A reserved field.
 E (1 bit): An extended field. It indicates whether there are F and L fields in a next field.
 LCID (5 bit): A logical channel ID field. It indicates a type of the MAC CE or a specific logical channel to which the MAC SDU belongs.
 F (1 bit): A format field. It indicates whether a next L field has a size of 7 bits or 15 bits.
 L (7 or 15 bit): A length field. It indicates a length of the MAC CE or MAC SDU corresponding to the MAC sub-header.

The F and L fields are not included in a MAC sub-header corresponding to a fixed-sized MAC CE.

Figure 8:
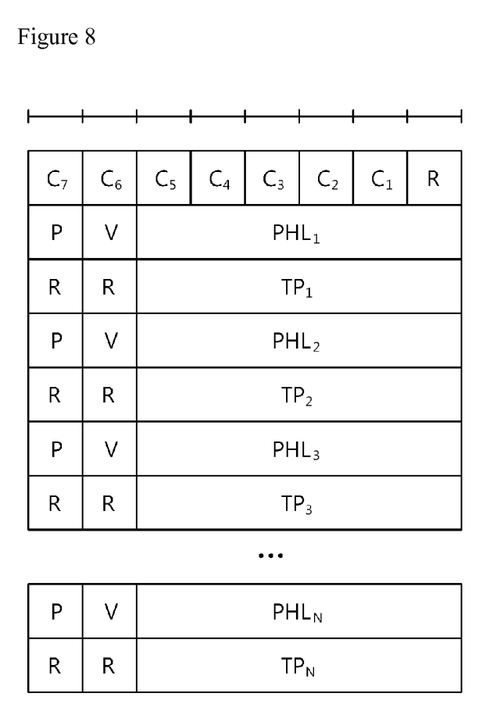
FIG. 8 is an example of extended MAC CE for PHR.

FIG. 8 is an example of extended MAC CE for PHR.

The extended MAC CE for PHR can be identified by a MAC PDU subheader with LCID corresponding to the extended MAC CE for PHR.

The extended MAC CE includes a PH per serving cell and followed by an octet containing the associated $P_{CMAX,c}$ (if reported). Then follows in ascending order based on the cell index of serving cells with a PH and the associated $P_{CMAX,c}$ (if reported).

The fields in the PHR can be defined as follows:
 Ci: this field indicates the presence of a PH for the secondary cell with the cell index i. The Ci field set to "1" indicates that a PH for the secondary cell with the cell index i is reported. The Ci field set to "0" indicates that a PH for the secondary cell with cell index i is not reported;
 R: reserved bit, set to "0";
 V: this field indicates if the PH value is based on a real transmission or a reference format. Furthermore, V=0 indicates the presence of the associated $P_{CMAX,c}$, and V=1 indicates that the associated $P_{CMAX,c}$ is omitted;

PHLn: this field indicates the power headroom level (PHL) for n-th serving cell, where n=1, . . . N. For the primary cell, n=1 and for zero or more secondary cells, n=2, . . . , N. Each PHL indicates the value of the corresponding PH.

P: the backoff indicator indicates whether the UE applies power backoff due to power management. The UE may set P=1 if the corresponding $P_{CMAX,c}$ would have had a different value if no power backoff due to power management had been applied;

TPn: if present, this transmit power (TP) field contains the $P_{CMAX,c}$ used for calculation of the preceding PH.

Now, power headroom reporting and transmit power control related to a P field will be described. The P field is also called a backoff indicator.

In general, a configured maximum transmit power $P_{CMAX}$ of a UE is obtained by applying maximum power reduction (MPR) to UE's uplink transmit power $P_{EMAX}$ given by a BS. That is, $P_{CMAX} < (P_{EMAX} - MPR)$. The MPR may be a lowest limit value of a maximum output power which is defined to allow the UE to autonomously perform power reduction. The UE can transmit a signal to the BS after autonomously reducing power within a value permitted by MPR. Since a difference between an average power and a maximum power becomes greater due to a high-order modulation scheme such as 16-QAM and a great number of allocated resource blocks (RBs), the MPR is introduced to overcome low power efficiency caused by the difference and to facilitate a design of a power amplifier of the UE.

According to the section 6.2 of 3GPP TS 36.101 V8.7.0 (2009-09), the MPR based on the modulation scheme and the RB is defined as follows.

TABLE 1

| Modulation Scheme | Channel Bandwidth (RB) | | | | | | MPR (dB) |
| --- | --- | --- | --- | --- | --- | --- | --- |
| | 1.4 MHz | 3.0 MHz | 5 MHz | 10 MHz | 15 MHz | 20 MHz | |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

The UE subtracts a transmit power to be currently used from a configured maximum transmit power to which the MPR is applied, and thereafter calculates a power headroom by additionally considering other factors such as a path loss. The transmit power to be currently used is calculated by considering a modulation scheme and an RB of an allocated uplink resource.

The UE can reduce a transmit power by randomly applying the MPR according to an implementation of the UE. That is, the BS cannot know an MPR value applied by the UE, which implies that the BS cannot correctly determine a maximum output power of the UE. Therefore, the BS can derive a power amount reduced by the UE according to a transmit power allocated by the BS to the UE on the basis of the power headroom.

In addition to the MPR, there is a case where the UE additionally performs power reduction due to a requirement related to a specific absorption rate (SAR).

The SAR is defined as a power amount absorbed per unit mass per unit time. In United States, the FCC requires that phones sold have a SAR level at or below 1.6 watts per kilogram (W/kg) taken over a volume containing a mass of 1 gram of tissue. In European Union, CENELEC specifies SAR limits within the EU, following IEC standards. For mobile phones, and other such hand-held devices, the SAR limit is 2 W/kg averaged over 10 g of tissue (IEC 62209-1). For Magnetic Resonance Imaging the limits (described in IEC 60601-2-33) are slightly more complicated.

For example, consider a case where the UE transmits a data packet to an LTE system, and simultaneously transmits a voice packet to a single carrier-radio transmission technology (1xRTT) system. Assume that an overall output power of the UE increases to exceed the SAR requirement. A priority of the data packet is lower than a priority of the voice packet in general. Therefore, in general, a transmit power of the data packet is decreased to meet the SAT requirement. This is called additional power reduction or power backoff due to power management.

The UE calculates $P_{CMAX,c}$ by considering both the MPR and the additional power reduction, and transmits the calculation result as the extended MAC CE of FIG. 5.

A P field is used in order for the BS not to know whether a received PH is calculated on the basis of $P_{CMAX,c}$ to which only power reduction is applied or on the basis of $P_{CMAX,c}$ to which additional power reduction is also applied. If the UE calculates the PH by applying the additional power reduction, the P field is set to 1.

If the P field is set to 1, the BS determines that the UE uses a transmit power for a different system other than the LTE system, and considers a UL radio resource in scheduling.

Since an amount of applying the additional power reduction is generated when there is transmission to a plurality of systems, it can be frequently changed according to a service traffic, and thus the UE frequently triggers PHR. To avoid this, a prohibit timer is used. After applying the additional power reduction, the PHR is triggered and then the prohibit timer starts. Even if new additional power reduction is applied while the prohibit timer is running, the PHR is not triggered.

However, the PHR can be triggered by a different PHR trigger condition even if the prohibit timer is running. For example, the PHR is triggered if a periodic timer expires.

In this case, a problem occurs in terms of utilization of a radio resource in the following situations.

Step 1: The UE applies the additional power reduction, and transmits the PHR to the BS. In this case, the P field of the PHR is set to 1. The prohibit timer starts.

Step 2: According to traffic generation of the different system, there is a change in whether power reduction is applied or not and in a power reduction amount. However, since the prohibit timer is running, the PHR is not triggered. Although the prohibit timer is running, the PHR can be triggered when the periodic timer expires. In this case, if additional power reduction does not temporarily exist, the UE reports the PHR by setting the P field to 0.

Step 3: If a service of the different system does not finish but additional power reduction is applied again in this situation, the PHR is not triggered since the prohibit timer is running. However, the BS can determine that there is no additional power reduction by using the PHR reported in advance. Therefore, there is a difference in power reduction between the BS and the UE.

The different of a maximum transmission power may cause inefficient UL scheduling. This is because, although the BS schedules UL transmission of the UE by using a higher transmit power, the UE performs UL transmission by applying additional power reduction at a power indicated by the BS.

According to the proposed invention, the UE triggers the PHR according to a change of an additional power reduction amount, and thereafter if the PHR is triggered even in a case where actual additional power reduction is not applied during a specific time period, the UE sets the P field to 1 irrespective of whether the additional power reduction is applied or not.

Maintaining of the additional power reduction during the specific time period is called virtual power backoff.

A time in which the virtual power backoff is applied is called a virtual power backoff time.

A value greater than or equal to a specific power level can be applied to power reduction during the virtual power backoff time. This is called a virtual power level. Information on the virtual power level can be set by the BS to the UE through an RRC message or a MAC message.

The virtual power backoff time can be set through the RRC message or the MAC message by the BS to the UE in a unit of subframe or radio subframe.

In order to define the virtual power backoff time, a virtual power backoff timer for additional power reduction can be introduced. When the UE triggers the PHR by applying additional power reduction, the UE starts the virtual power backoff timer. Even if there is no actual additional power reduction while the virtual power backoff timer is running, the UE determines that there is virtual additional power reduction. That is, if the PHR is triggered while the virtual power backoff timer is running, the UE sets the P field to 1.

The virtual power backoff timer starts only when the PHR is triggered by applying additional power reduction. The virtual power backoff timer does not start or restart by a PHR report in which the P field is set to 1 by a different PHR trigger condition.

When the PHR is triggered by the different PHR trigger condition while the virtual power backoff timer is running, if actual additional power reduction is applied, the UE can set the P field of the reported PHR to 1, and then can restart the virtual power backoff timer. On the other hand, when the PHR is triggered by the different PHR trigger condition while the virtual power backoff timer is running, if there is no actual additional power reduction and there is only virtual additional power reduction, the UE sets the P field of the reported PHR to 1, but does not restart the virtual power backoff timer.

Figure 9:
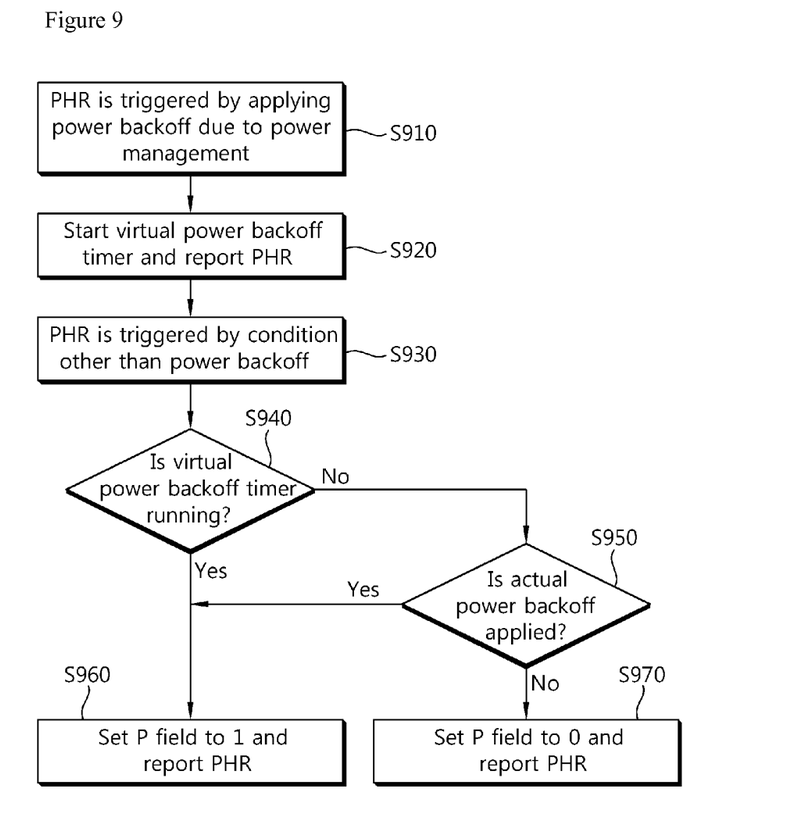
FIG. 9 is a flowchart showing a PH reporting method according to an embodiment of the present invention.

FIG. 9 is a flowchart showing a PH reporting method according to an embodiment of the present invention.

In step S910, when a PHR (i.e., a 1st PHR) is triggered, a UE determines whether power backoff due to power management is applied. For example, the UE determines whether the PHR is triggered by a change of an additional power reduction amount caused by a power management requirement. The change of the additional power reduction amount implies a case where there is a change greater than a reference change value which is set to the UE by a BS. Alternatively, it is a case where a P field of the latest PHR is 0, and a P field of the 1st PHR currently triggered is set to 1.

In step S920, if power backoff due to power management is applied, a virtual power backoff timer starts, and the 1st PHR is reported. In this case, the P field of the 1st PHR is 1.

In step 930, the UE triggers again a new PHR (i.e., a 2nd PHR). The 2nd PHR is not caused by the change of the additional power reduction amount, but is triggered by a different trigger condition such as an expiry of a periodic timer.

In step S940, in the determining of the P field included in the PHR, the UE determines whether the virtual power backoff timer is running.

In step S960, if the virtual power backoff timer is running, the UE sets the P field to 1 irrespective of whether actual power backoff is applied or not, and reports the PHR. For example, since there is no transmission to a different system other than the LTE system, the UE reports the PHR to the BS by setting the P field to 1 even if there is no additional power reduction.

If actual power backoff is applied, the UE can restart a virtual power backoff timer which is currently running. If the P field is set to 1 without applying actual power backoff, the UE may not restart the virtual power backoff timer.

In step S950, if the virtual power backoff timer is not running, the UE sets the P field according to whether actual power backoff is applied or not.

In step S970, if the power backoff is not applied, the UE reports the PHR by setting the P field to 0. If the power backoff is applied, the UE reports the PHR by setting the P field to 1.

A value of the virtual power backoff timer can be set by the BS to the UE through an RRC message or a MAC message.

The virtual power backoff timer can be set independently from a prohibit timer.

Without defining the virtual power backoff timer, the UE can apply the aforementioned virtual power backoff in which the prohibit timer is running. For example, the PHR can be reported by setting the P field to 1 while the prohibit timer is running.

When calculating a transmit power, it is possible to prevent a mismatch between the BS and the UE. The BS can more accurately perform UL scheduling.

Figure 10:
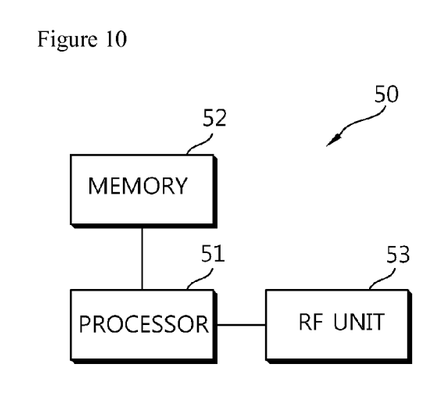
FIG. 10 is a block diagram showing a wireless apparatus for implementing an embodiment of the present invention.

FIG. 10 is a block diagram showing a wireless apparatus for implementing an embodiment of the present invention. The wireless apparatus may be a part of a UE.

A wireless apparatus 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes and/or methods. The processor 51 may perform operations of UE according to the embodiment of FIG. 9.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method of reporting a power headroom in a wireless communication system, performed by a user equipment, the method comprising:
   transmitting a first power headroom report to a base station, the first power headroom report including a power headroom level indicating a power headroom and a first backoff indicator indicating whether the user equipment applies power backoff due to power management;
   starting a virtual power backoff timer upon transmitting the first power headroom report; and
   when a second power headroom report is triggered while the virtual power backoff timer is running, transmitting the second power headroom report including a second backoff indicator with a same value of the first backoff indicator.

2. The method of claim 1, wherein the power headroom report further includes a transmit power field indicating a configured transmit power used to determine the power headroom.

3. The method of claim 2, wherein the first backoff indicator is set to one if the transmit power field would have had a different value if no power backoff due to power management had been applied.

4. The method of claim 3, wherein the virtual power backoff timer is started if the value of the first backoff indicator is set to one.

5. The method of claim 1, further comprising:
   restarting the virtual power backoff timer if the user equipment maintains to apply the power backoff due to power management.

6. The method of claim 1, wherein the second power headroom report is triggered if a periodic timer expires.

7. A user equipment for reporting a power headroom in a wireless communication system, comprising:
   a radio frequency unit configured to transmit and receive a radio signal; and
   a processor operatively coupled with the radio frequency unit and configured to:
   transmit a first power headroom report to a base station, the first power headroom report including a power headroom level indicating a power headroom and a first backoff indicator indicating whether the user equipment applies power backoff due to power management;
   start a virtual power backoff timer upon transmitting the first power headroom report; and
   when a second power headroom report is triggered while the virtual power backoff timer is running, transmit the second power headroom report including a second backoff indicator with a same value of the first backoff indicator.

8. The user equipment of claim 7, wherein the power headroom report further includes a transmit power field indicating a configured transmit power used to determine the power headroom.

9. The user equipment of claim 8, wherein the first backoff indicator is set to one if the transmit power field would have had a different value if no power backoff due to power management had been applied.

10. The user equipment of claim 9, wherein the virtual power backoff timer is started if the value of the first backoff indicator is set to one.

11. The user equipment of claim 7, wherein the processor is configured to restart the virtual power backoff timer if the user equipment maintains to apply the power backoff due to power management.

12. The user equipment of claim 7, wherein the second power headroom report is triggered if a periodic timer expires.

* * * * *